(12) United States Patent
Zubarieva et al.

(10) Patent No.: US 11,087,156 B2
(45) Date of Patent: Aug. 10, 2021

(54) METHOD AND DEVICE FOR DISPLAYING HANDWRITING-BASED ENTRY

(71) Applicant: Samsung Electronics Co., Ltd., Suwon-si (KR)

(72) Inventors: Olha Zubarieva, Kyiv (UA); Tetiana Ignatova, Kyiv (UA); Ivan Deriuga, Kyiv (UA); Olga Radyvonenko, Kyiv (UA); Serhii Polotskyi, Kyiv (UA); Vadym Osadchiy, Kyiv (UA); Oleksandr Shchur, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 53 days.

(21) Appl. No.: 16/441,364

(22) Filed: Jun. 14, 2019

(65) Prior Publication Data

US 2020/0272840 A1 Aug. 27, 2020

(30) Foreign Application Priority Data

Feb. 22, 2019 (KR) .................. 10-2019-0021339

(51) Int. Cl.
*G06K 9/00* (2006.01)
*G06K 9/66* (2006.01)

(52) U.S. Cl.
CPC .......... *G06K 9/00879* (2013.01); *G06K 9/66* (2013.01)

(58) Field of Classification Search
CPC .. G06K 9/00879; G06K 9/66; G06K 2209/01; G06K 9/627; G06K 9/00852
See application file for complete search history.

(56) References Cited

U.S. PATENT DOCUMENTS

| 5,680,480 A * | 10/1997 | Beernink | G06K 9/033 382/155 |
| 6,111,985 A * | 8/2000 | Hullender | G06K 9/00879 382/187 |
| 6,212,297 B1 * | 4/2001 | Sklarew | G06F 3/033 382/189 |
| 7,171,353 B2 | 1/2007 | Trower, II et al. | |
| 7,886,233 B2 | 2/2011 | Rainisto et al. | |
| 8,413,069 B2 | 4/2013 | Blair et al. | |
| 8,782,556 B2 | 7/2014 | Badger et al. | |
| 9,411,508 B2 * | 8/2016 | Goldsmith | G06F 3/04883 |
| 9,557,916 B2 | 1/2017 | Robinson et al. | |
| 9,606,634 B2 | 3/2017 | Assadollahi | |
| 9,626,429 B2 | 4/2017 | Unruh | |

(Continued)

FOREIGN PATENT DOCUMENTS

JP 6271728 B2 1/2018
WO 2017/148834 A1 9/2017

OTHER PUBLICATIONS

International Search Report with Written Opinion dated Dec. 20, 2019; International Appln. No. PCT/KR2019/008365.

*Primary Examiner* — Xuemei G Chen
(74) *Attorney, Agent, or Firm* — Jefferson IP Law, LLP

(57) ABSTRACT

A system and method for detecting, identifying, and displaying handwriting-based entry is provided. The system and method include features for detecting entry of at least one first letter based on handwriting, identifying a style of the at least one first letter, and displaying at least one second letter associated with the at least one first letter based on, and in the form of, the identified style of the at least one first letter.

16 Claims, 8 Drawing Sheets

(56) References Cited

U.S. PATENT DOCUMENTS

| | | |
|---|---|---|
| 9,659,002 B2 | 5/2017 | Medlock et al. |
| 9,721,362 B2 | 8/2017 | Smolinski et al. |
| 9,747,708 B2 | 8/2017 | Cheong et al. |
| 10,083,163 B2* | 9/2018 | Hickey ............... G06F 40/174 |
| 10,387,721 B2* | 8/2019 | Locker ............... G06K 9/00402 |
| 10,664,658 B2* | 5/2020 | Mannby .............. G06F 40/205 |
| 10,684,771 B2* | 6/2020 | Kim .................... G06F 3/03545 |
| 2004/0255218 A1* | 12/2004 | Tada ..................... G06K 9/72 714/747 |
| 2005/0249419 A1* | 11/2005 | Rieman ................ G06K 9/723 382/229 |
| 2006/0126946 A1 | 6/2006 | Denoue et al. |
| 2007/0140561 A1 | 6/2007 | Abdulkader et al. |
| 2009/0189905 A1* | 7/2009 | Cho ..................... G06K 9/6255 345/467 |
| 2010/0128985 A1* | 5/2010 | El-Sana ............... G06K 9/00402 382/189 |
| 2013/0046544 A1* | 2/2013 | Kay ..................... G06F 16/3322 704/275 |
| 2013/0311880 A1* | 11/2013 | Shin .................... G06F 3/04883 715/268 |
| 2014/0022184 A1* | 1/2014 | Bathiche ............. G06F 3/04883 345/173 |
| 2015/0169975 A1* | 6/2015 | Kienzle ................ G06T 1/0007 382/189 |
| 2015/0269431 A1* | 9/2015 | Haji .................... G06K 9/00879 382/186 |
| 2015/0339051 A1* | 11/2015 | Yang ..................... G06F 3/0482 382/189 |
| 2016/0004672 A1* | 1/2016 | Sakunkoo ............. G06F 40/109 715/269 |
| 2016/0062634 A1* | 3/2016 | Kurita ................. G06K 9/00402 715/268 |
| 2016/0154997 A1 | 6/2016 | Kim et al. |
| 2016/0364607 A1* | 12/2016 | VanBlon ............. G06F 3/0416 |
| 2017/0052696 A1* | 2/2017 | Oviatt ................ G06F 3/04883 |
| 2017/0235373 A1* | 8/2017 | Mok ................... G06K 9/00402 382/189 |
| 2017/0270357 A1* | 9/2017 | Winebrand ........ G06K 9/00436 |
| 2017/0344817 A1* | 11/2017 | Fei ......................... G06K 9/344 |
| 2018/0067640 A1* | 3/2018 | Jiang ....................... G06F 17/10 |
| 2019/0034406 A1* | 1/2019 | Singh .................. G06F 3/04883 |
| 2019/0114478 A1* | 4/2019 | Xi ....................... G06F 3/04883 |

* cited by examiner

METHOD AND DEVICE FOR DISPLAYING HANDWRITING-BASED ENTRY

CROSS-REFERENCE TO RELATED APPLICATION(S)

This application is based on and claims priority under 35 U.S.C. § 119(a) of a Korean patent application number 10-2019-0021339, filed on Feb. 22, 2019, in the Korean Intellectual Property Office, the disclosure of which is incorporated by reference herein in its entirety.

BACKGROUND

1. Field

The disclosure relates to methods and devices for displaying handwriting-based entry. More particularly, the disclosure relates to user-adaptive display methods for displaying handwriting-based entry.

2. Description of Related Art

A user's entry on an electronic device is performed mostly by typing. Typing may be conducted on a virtual keyboard or its equivalent shape displayed on a touchscreen display. However, handwriting is the most fundamental way in which a human being represents letters and, in many contexts, handwriting enables representation of letters in easier and more various manners than typing. Thus, techniques are being developed for perceiving and displaying a user's entry based on handwriting on an electronic device.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide a method for user-adaptively displaying a user's entry based on handwriting.

Another aspect of the disclosure is to provide a method for enhancing letter-entering speed through a user's handwriting.

Aspects of the disclosure are not limited to the foregoing, and other unmentioned aspects would be apparent to one of ordinary skill in the art from the following description.

In accordance with an aspect of the disclosure, a method for displaying handwriting-based entry is provided. The method includes detecting entry of at least one first letter based on handwriting, identifying a style of the at least one first letter, and displaying at least one second letter associated with the at least one first letter based on the identified style of the at least one first letter.

In accordance with another aspect of the disclosure, an electronic device configured to display handwriting-based entry is provided. The electronic device includes a memory, a communication interface, and at least one processor connected with the memory and the communication interface, wherein the at least one processor is configured to detect entry of at least one first letter based on handwriting, identify a style of the at least one first letter, and display at least one second letter associated with the at least one first letter based on the identified style of the at least one first letter.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the," include plural referents unless the context clearly dictates otherwise. Thus, for example, reference to "a component surface" includes reference to one or more of such surfaces.

Although the terms "first" and "second" are used to describe various components, the components are not limited by the terms. These terms are provided simply to distinguish one component from another. Accordingly, the first component mentioned herein may also be the second component within the technical spirit of the disclosure.

Figure 1:
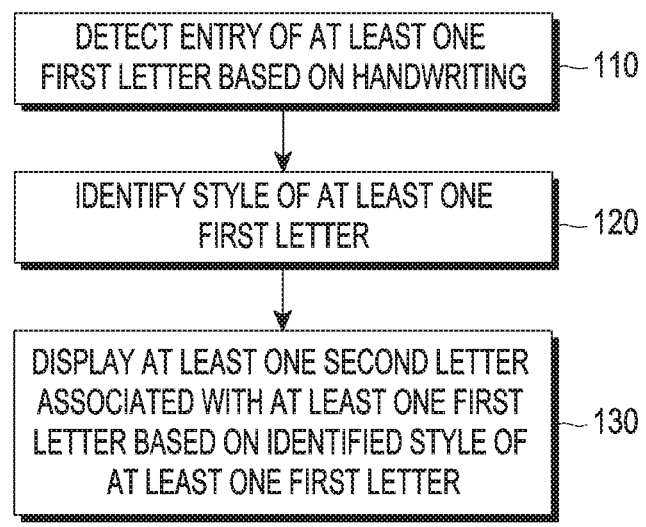
FIG. 1 is a flowchart illustrating a method for displaying entry based on handwriting according to an embodiment of the disclosure.

FIG. 1 is a flowchart illustrating a method for displaying entry based on handwriting according to an embodiment of the disclosure.

Referring to FIG. 1, the operations may be performed by an electronic device. The electronic device may receive a handwriting-based entry from a user through a tablet or a touchscreen display embedded therein or configured individually therefrom and wiredly or wirelessly connected thereto. According to an embodiment, the electronic device may detect and receive a handwriting-based entry, which is represented by the user's motion, from the user using a motion detector embedded therein or configured individually therefrom and wiredly or wirelessly connected thereto. The electronic device may be any one of mobile phones, smartphones, tablet personal computers (PCs), other various devices capable of receiving and processing entry through a touchscreen included therein or connected thereto, PCs, laptop computers, virtual reality (VR) devices, or augmented reality (AR) devices, but embodiments are not limited thereto.

The electronic device may detect entry of at least one first letter based on handwriting at operation 110. Entry of the at least one first letter based on handwriting may be detected through a touchscreen display, a tablet, or a motion detector. To enter the at least one first letter based on handwriting, the user may touch the touchscreen display or tablet with the user's body portion or a tool, e.g., a pen recognizable by the touchscreen display or use the user's gesture. The electronic device may display the entered handwriting-based entry of the at least one letter. The electronic device may trace and display the at least one first letter entered, in the shape detected. According to an embodiment, although the shape corresponding to the handwriting-based entry is not a letter, the electronic device may display the entered shape as it is. Detecting, at operation 110, the entry of the at least one first letter based on handwriting may include identifying the shape of the at least one first letter entered and identifying the at least one first letter. Identifying the shape of the at least one first letter may mean identifying the at least one first letter. A method of identifying the at least one first letter is described below in greater detail with reference to FIG. 15.

The electronic device may identify a style of the at least one first letter at operation 120. The user may have a unique style of handwriting. The user's style may be reflected in the at least one handwriting-based first letter. The electronic device may identify the style of the at least one first letter, originating from the user, from the shape of the at least one first letter entered and identified. Identifying the style of the at least one first letter may include identifying a style for representing letters other than the at least one first letter in the same style as the first letter.

The electronic device may establish a database for the user's style based on entries of letters based on handwriting from prior use or from prior users. The database may be stored in a memory of the electronic device. The electronic device may identify the style of the at least one first letter through identifying whether the style of the at least one first letter entered is the same as the user's style stored in the database. The database for the user's style may be updated based on information about the style of the at least one first letter entered.

According to an embodiment, the electronic device may establish a database for the style of each of a plurality of users. The electronic device may identify the style of the at least one first letter through identifying the style of the user corresponding to the style of the at least one first letter entered among the styles of the plurality of users included in the database.

According to an embodiment, the electronic device may transmit information about entry of the at least one first letter to a server. The information about entry of the at least one first letter may include information about the entered shape of the at least one first letter. The server may identify the style of the at least one first letter entered, based on the received information about entry of the at least one first letter. The server may also include a database for the style of each of the plurality of users and identify the style of at least one first letter using the database. According to an embodiment, the server may identify the style of the at least one first letter based on information about entries of a plurality of letters gathered, using deep learning. The server may transmit the identified style of the at least one first letter to the electronic device.

The electronic device may display at least one second letter associated with the at least one first letter based on the identified style of the at least one first letter at operation 130. According to an embodiment, the at least one second letter, together with the at least one first letter, may complete one word. According to an embodiment, the at least one second letter, together with the at least one first letter, may complete one sentence or part of one sentence. The electronic device may user-adaptively select a word, a sentence, or part of a sentence completed by the at least one first letter and the at least one second letter. The electronic device may create, and store in the memory, a database of words and sentences entered by the user's handwriting or typing. The electronic device may deduce (or estimate) the word or sentence that the user intends to enter based on the database and the at least one first letter. The electronic device may identify the at least one second letter displayed based on the deduced word or sentence that the user intends to enter. The electronic device may identify the at least one second letter using the same style as the identified style of the at least one first letter. In response to detecting the user's additional entry or confirmation of the at least one second letter displayed, the electronic device may display the word, sentence, or part of the sentence, which is configured by the at least one first letter and the at least one second letter, as if it has been entered by the user. By so doing, an auto-complete function may be achieved for words or sentences, thereby enhancing the speed of handwriting-based letter entry while maintaining the user's style. A method of predicting the at least one second letter is described below in greater detail with reference to FIG. 16.

Methods of displaying letters based on handwriting according to embodiments are described below in connection with specific examples.

Figure 2:
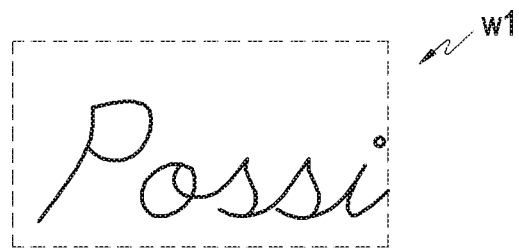
FIGS. 2, 3, and 4 are views illustrating examples of a word display of handwriting-based entry according to embodiments of the disclosure.
Figure 3:
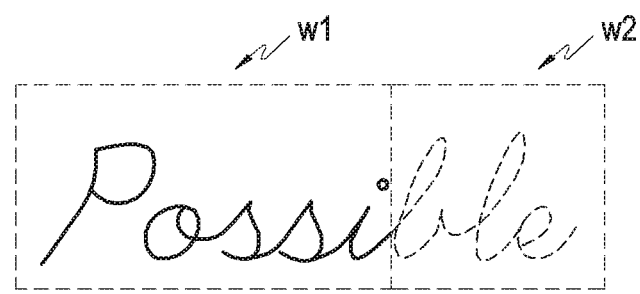
Figure 4:
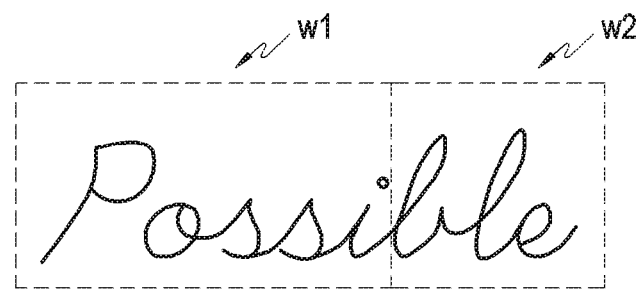

FIGS. 2, 3, and 4 are views illustrating examples of a word display of handwriting-based entry according to embodiments of the disclosure.

Referring to FIG. 2, an electronic device may display first letters W1 entered based on a user's handwriting. The first letters W1 may be displayed in the same shape as the first letters W1 entered by the user. The first letters W1 may be displayed as the user's entry is traced. The electronic device may identify the style of the first letters W1 through its own database or through inquiring a server.

By identifying the first letters W1, the electronic device may user-adaptively identify the word that the user intends to enter. For example, the electronic device may deduce the word 'Possible' which the user intends to enter from the first letters W1 of 'Possi.' The electronic device may user-adaptively deduce the word that the user intends to enter, using a database previously configured.

Referring to FIG. 3, the electronic device may identify and display second letters W2 to complete the word that the user intends to enter, in addition to the first letters W1. The second letters W2 may be, e.g., 'ble.' The second letters W2 may be represented in a different form from the first letters W1. In the example shown in FIG. 3, the first letters W1 may be represented in solid lines, and the second letters W2 may be represented in dashed lines. According to an embodiment, the first letters W1 and the second letters W2 may be represented in different colors or thicknesses. Methods of representing the second letters W2 in a different form from the first letters W1 are not limited to those described above. The second letters W2 may be displayed according to the identified style of the first letters W1.

Referring to FIG. 4, upon detecting the user's entry to identify entry of the second letters W2 after representing the second letters W2 in a different form from the first letters W1, the form of the second letters W2 may be changed to be the same as the form of the first letters W1. The user's entry to identify entry of the second letters W2 may be, e.g., a tap, double-tap, or long-tap on the touchscreen for the second letters W2 or a particular gesture identifiable by a motion detector, or simply expiration or a timer, but embodiments are not limited thereto.

Figure 5:
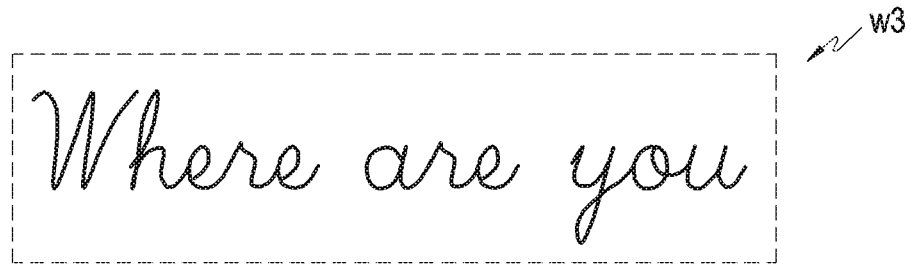
FIGS. 5, 6, and 7 are views illustrating examples of a plurality of words display of handwriting-based entry according to embodiments of the disclosure.
Figure 6:
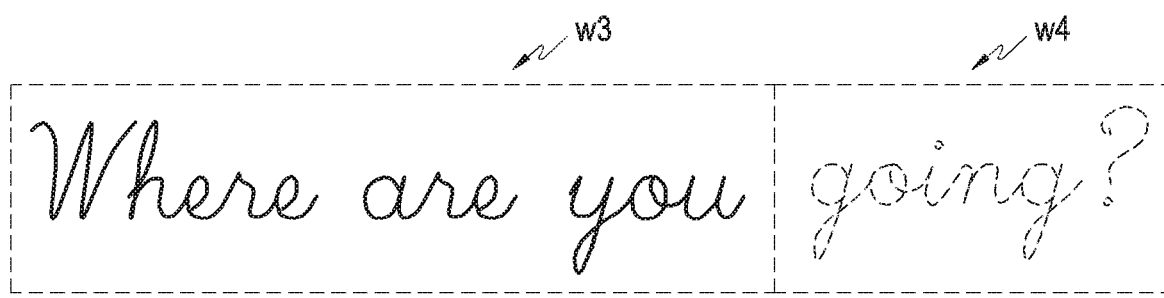
Figure 7:
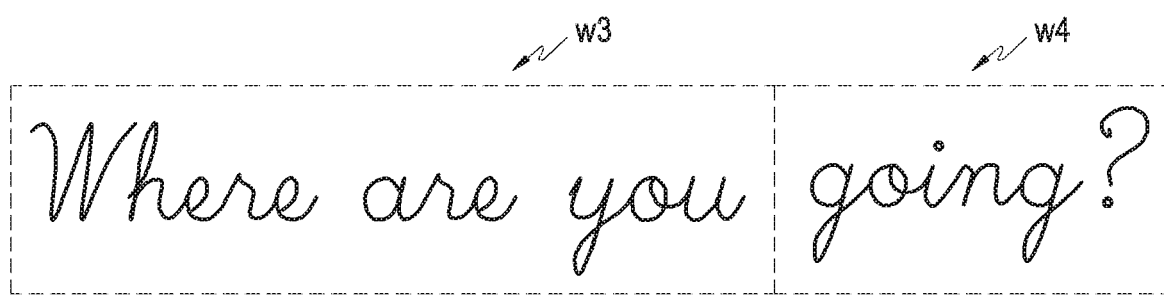

FIGS. 5, 6, and 7 are views illustrating examples of a plurality of words display of handwriting-based entry according to embodiments of the disclosure.

Referring to FIG. 5, an electronic device may display third letters W3 entered based on a user's handwriting. The third letters W3 may be displayed in the same shape as the third letters W3 entered by the user. The electronic device may identify the style of the third letters W3 through its own database or through inquiring a server.

By identifying the third letters W3, the electronic device may user-adaptively identify the word that the user intends to enter. For example, the electronic device may deduce that the sentence which the user intends to enter is 'Where are you going?' from the third letters W3 'Where are you.' The electronic device may user-adaptively deduce the sentence that the user intends to enter, using a database previously configured.

Referring to FIG. 6, the electronic device may identify and display fourth letters W4 to complete the sentence that the user intends to enter, in addition to the third letters W3. The fourth letters W4 may be, e.g., 'going?' The fourth letters W4 may be represented in a different form from the third letters W3. The fourth letters W4 may be displayed according to the identified style of the third letters W3.

Referring to FIG. 7, upon detecting the user's entry to identify entry of the fourth letters W4 after representing the fourth letters W4 in a different form from the third letters W3, the form of the fourth letters W4 may be changed to be the same as the form of the third letters W3 in the manner described above with regard to FIG. 4.

Figure 8:
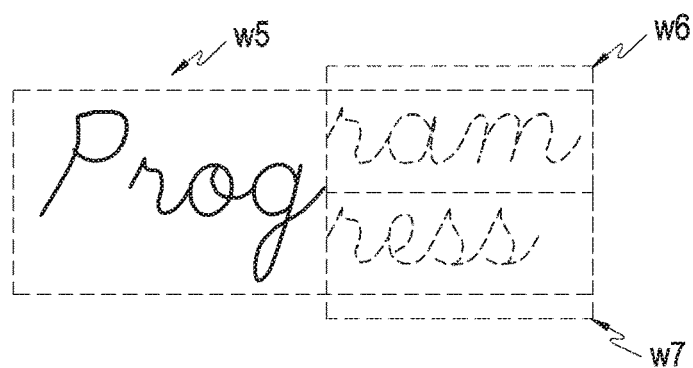
FIGS. 8 and 9 are views illustrating examples of alternate words display of handwriting-based entry according to embodiments of the disclosure.
Figure 9:
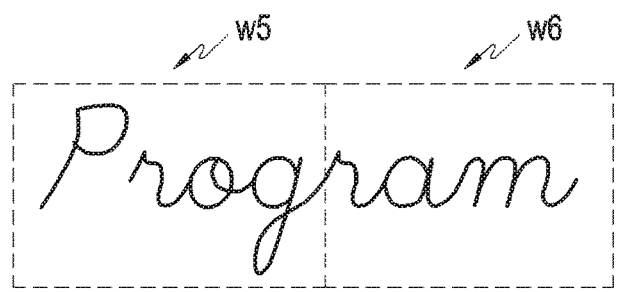

FIGS. 8 and 9 are views illustrating examples of alternate words display of handwriting-based entry according to embodiments of the disclosure.

Referring to FIG. 8, an electronic device may detect and display entry of fifth letters W5 based on a user's handwriting and then deduce a plurality of candidates for the word which the user intends to complete from the fifth letters W5. For example, the electronic device may deduce 'Program' and 'Progress' as the plurality of candidates for the word which the user intends to complete from entry of the fifth letters W5 'Prog.' The plurality of candidates for the word which the user intends to complete may user-adaptively be selected based on a database. The electronic device may identify sixth letters W6 (i.e., 'ram') based on 'Program' and seventh letters W7 (i.e., 'ress') based on 'Progress.' The electronic device may simultaneously display the identified sixth letters W6 and seventh letters W7. The sixth letters W6 and the seventh letters W7 may be displayed according to the style of the fifth letters W5 identified by the electronic device. The sixth letters W6 and the seventh letters W7 may be displayed in a different form from the fifth letters W5.

In response to detecting the user's entry to select any one of the sixth letters W6 and seventh letters W7 displayed, the electronic device may refrain from displaying the non-selected letters among the sixth letters W6 and the seventh letters W7 and display the selected letters so that the selected letters may be connected with the fifth letters W5 in the same form and style as the fifth letters W5 to thereby complete one word in the manner described above with regard to FIG. 4.

Referring to FIG. 9, in response to detection of the user's entry to select the sixth letters W6, the sixth letters W6 are displayed so that the sixth letters W6 are connected with the fifth letters W5 in the same form and style as the fifth letters W5 to thereby complete the word 'Program.'

Substantially the same description given for the embodiments in connection with FIGS. 8 and 9 may apply to embodiments in which the electronic device displays a plurality of candidates to complete a sentence based on letters entered by the user.

Figure 10:
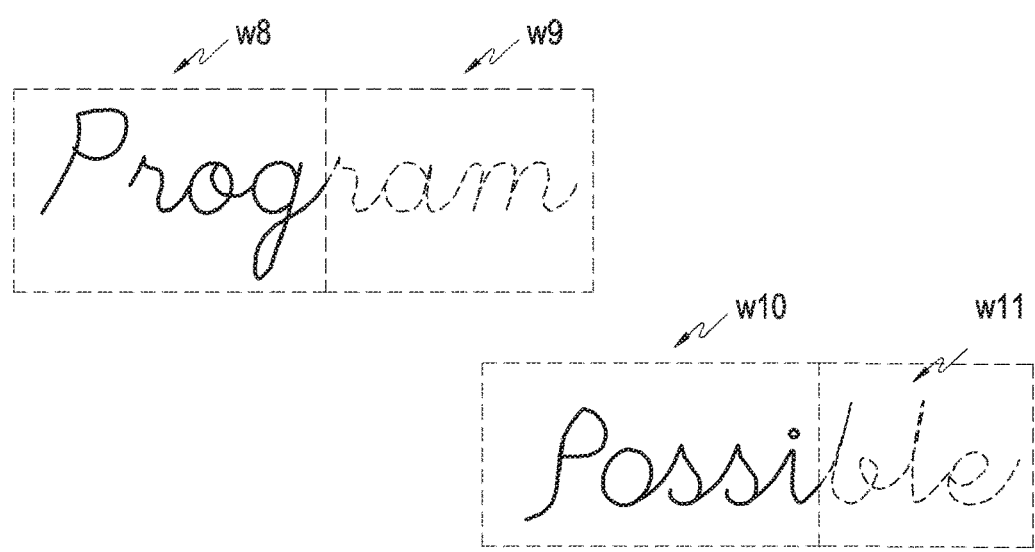
FIG. 10 is a view illustrating examples of multiple user display of handwriting-based entry according to embodiments of the disclosure.

FIG. 10 is a view illustrating examples of multiple user display of handwriting-based entry according to embodiments of the disclosure.

Referring to FIG. 10, an electronic device may detect entry of eighth letters W8 and entry of tenth letters W10 and may simultaneously display the eighth letters W8 and the tenth letters W10. The eighth letters W8 and the tenth letters W10 may be entered in different styles. For example, the eighth letters W8 and the tenth letters W10 may be entered by different users. The electronic device may identify the style of each of the eighth letters W8 and the tenth letters W10. The electronic device may identify the word which one user intends to enter in connection with the eighth letters W8 and the word which another user intends to enter in connection with the tenth letters W10. The electronic device may user-adaptively deduce the word which the one user intends to enter in connection with the eighth letters W8 and the word which the other user intends to enter in connection with the tenth letters W10, using a database of the words entered by the plurality of users. According to an embodiment, the electronic device may identify the user who has entered the eighth letters W8 based on the identified style of the eighth letters W8 and the user who has entered the tenth letters W10 based on the identified style of the tenth letters W10. Based on the eighth letter W8 and the word deduced as intended to enter by the user who has entered the eighth letters W8, the electronic device may identify ninth letters W9 to complete the deduced word. For example, when the eighth letters W8 are 'Prog,' and the word deduced as intended to enter by the user is 'Program,' the ninth letters W9 may be identified to be 'ram.' Based on the tenth letter W10 and the word deduced as intended to enter by the user who has entered the tenth letters W10, the electronic device may identify eleventh letters W11 to complete the deduced word. For example, when the tenth letters W10 are 'Possi,' and the word deduced as intended to enter by the user is 'Possible,' the eleventh letters W11 may be identified to be 'ble.'

The identified ninth letters W9 and eleventh letters W11 may be displayed by the electronic device. The ninth letters W9 may be displayed according to the style of the eighth letters W8, and the eleventh letters W11 may be displayed according to the style of the tenth letters W10. The ninth letters W9 may be displayed in a different form from the form of the eighth letters W8, and the eleventh letters W11 may be displayed in a different form from the form of the tenth letters W10. In response to detection of the user's entry to identify entry of the ninth letters W9 after the ninth letters W9 and the eleventh letters W11 are displayed, the electronic device may change the form of the ninth letters W9 to be the same as the form of the eighth letters W8 and, in response to detection of the user's entry to identify entry of the eleventh letters W11, the electronic device may change the form of the eleventh letters W11 to be the same as the form of the tenth letters W10 in the manner described above with regard to FIG. 4.

According to an embodiment, a method for correcting the user's typographical errors may be performed in a similar manner to those described above. For example, the electronic device may detect and display entry of letters based on handwriting. The electronic device may identify whether entered letters have a typographical error. The electronic device may user-adaptively identify the word or sentence that the user intends to enter based on a database for words or sentences entered by the user and may identify whether there is a typographical error based on the entered letters and the identified word or sentence that the user intends to enter. Upon identifying that the entered letters have a typographical error, the electronic device may display at least one additional letter to correct the typographical error. The at least one additional letter to correct the typographical error may be displayed adjacent the letter, which is to be corrected according to the style of the letters entered. When the user's entry to identify error correction is detected, the corrected letters may be displayed according to the style of the letters entered.

Figure 11:
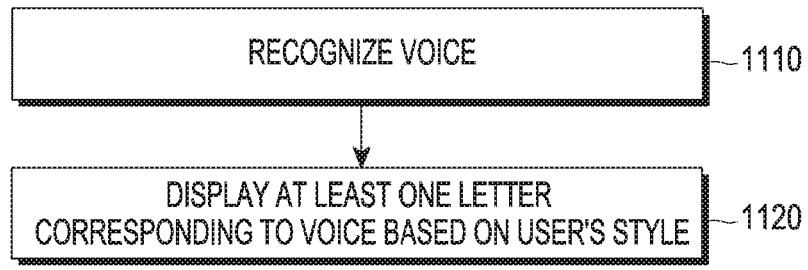
FIG. 11 is a flowchart illustrating a method for displaying at least one letter based on a user's style according to an embodiment of the disclosure.

FIG. 11 is a flowchart illustrating a method for displaying at least one letter based on a user's style according to an embodiment of the disclosure.

Referring to FIG. 11, an electronic device may recognize a voice at operation 1110. Recognizing a voice may include identifying at least one letter configuring the language represented by the voice. According to an embodiment, recognizing a voice may further include identifying the user who has uttered the recognized voice among a plurality of users for the electronic device.

The electronic device may display at least one letter corresponding to the voice based on the user's style at operation 1120. Information about the user's style may be stored in a database of a server or the electronic device. According to an embodiment, the user's style may be the user's style set as default in the electronic device. According to an embodiment, the electronic device may identify the user who has uttered the recognized voice among the plurality of users for the electronic device and display at least one letter corresponding to the voice based on the identified style of the user.

Figure 12:
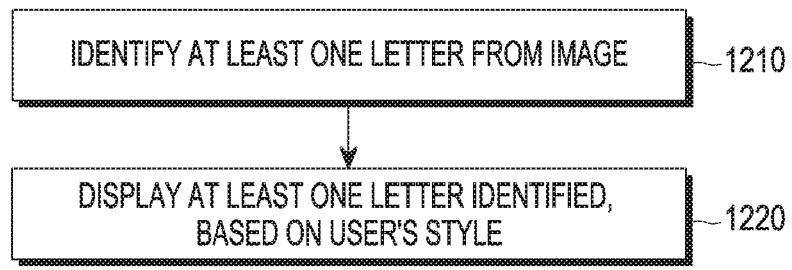
FIG. 12 is a flowchart illustrating a method for displaying at least one letter based on a user's handwriting according to an embodiment of the disclosure.

FIG. 12 is a flowchart illustrating a method for displaying at least one letter based on a user's handwriting according to an embodiment of the disclosure.

Referring to FIG. 12, an electronic device may identify at least one letter from an image at operation 1210. The image may be one captured by a camera included in the electronic device or a camera wiredly or wirelessly connected to the electronic device, but embodiments are not limited thereto. For example, the image may be one received from another device. The identification of at least one letter from the image may be performed using a known optical character recognition (OCR) technique.

The electronic device may display at least one identified letter based on the user's style at operation 1220. The user's style may be the user's style set as default in the electronic device. According to an embodiment, displaying the at least one identified letter may include displaying an image modified from the original image. The modified image may be generated by modifying an area of the original image, where at least one letter is identified, into an area where at least one letter is displayed according to the user's style. According to an embodiment, one identified letter may be displayed regardless of the original image.

Figure 13:
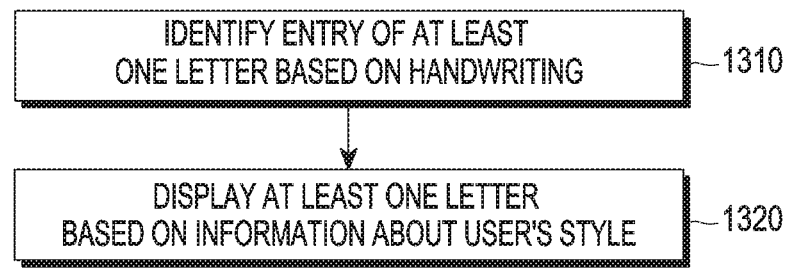
FIG. 13 is a flowchart illustrating a method for displaying at least one letter based on a user's handwriting according to an embodiment of the disclosure.

FIG. 13 is a flowchart illustrating a method for displaying at least one letter based on a user's handwriting according to an embodiment of the disclosure.

Referring to FIG. 13, an electronic device may identify entry of at least one letter based on handwriting at operation 1310. Substantially the same description given for operation 110 of FIG. 1 may apply to operation 1310, and no further description of operation 1310 is given.

The electronic device may display the at least one letter based on information about the user's style at operation 1320. Specifically, the electronic device may display at least one letter entered according to the user's style represented by the information about the user's style as obtained by the electronic device from a network or stored in the electronic device for the shape of the at least one letter entered.

Figures 14, 15:
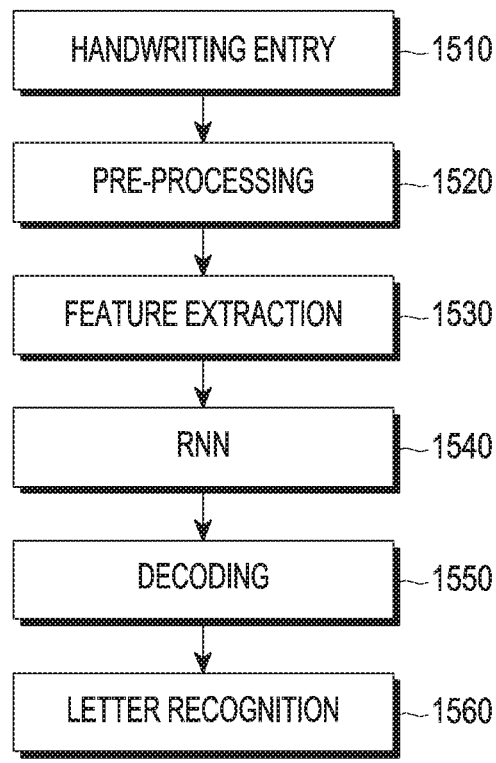
FIG. 14 is a view illustrating example letters entered and displayed in an embodiment related to FIG. 13 according to an embodiment of the disclosure.
FIG. 15 is a flowchart illustrating a method for identifying at least one letter from a user's handwriting entry according to an embodiment of the disclosure.

FIG. 14 is a view illustrating example letters entered and displayed in an embodiment related to FIG. 13 according to an embodiment of the disclosure.

Referring to FIG. 14, entered letters 1410 show the shape of letters actually enterable based on handwriting in operation 1310. Output letters 1420 represent the shape of letters displayable in operation 1320. That is, according to an embodiment related to FIGS. 13 and 14, the letters 1410 entered may differ in shape from the output letters 1420. Such a method enables display of the output letters 1420 in an organized shape even where the letters 1410 are entered in a coarse shape, and still allow the output letters 1420 to be displayed according to the user's style.

FIG. 15 is a flowchart illustrating a method for identifying at least one letter from a user's handwriting entry according to an embodiment of the disclosure.

Referring to FIG. 15, an electronic device may detect handwriting entry at operation 1510.

The electronic device may perform pre-processing on the detected handwriting entry at operation 1520. The pre-processing may include performing at least one of slant normalization, skew normalization, and size normalization on the detected handwriting entry.

The electronic device may perform feature extraction on the pre-processed handwriting entry at operation 1530. The features of style for the handwriting entry may be identified through feature extraction. Features extracted may include a first class of features which are extracted considering surrounding points in the time series for each point and a second class of features which are based on spatial information given by an offline matrix representation. For example, the first class of features is as follows.

A feature of indicating whether the pen tip touches the board or not;

A hat feature of indicating whether the stroke delayed on the y axis has been removed;

Speed calculated before resampling;

An x coordinate after high-pass filtering (i.e., after the moving average is deducted from the actual horizontal position);

A y coordinate after normalization;

Sine and Cosine values (writing direction) of the angle between the x axis and the line segment starting at the point;

Sine and Cosine values (curvature) of the angle between the line to the prior point and the line to the next point;

Vicinity aspect (same as the aspect of trajectory);

Sine and Cosine of the line from the first vicinity point to the last vicinity point;

A length of the adjacent trajectory divided by max($\Delta x(t)$, $\Delta y(t)$); and An average of the squares of distances to the points adjacent the line from the first vicinity point to the last vicinity point.

The second class of features are calculated using the two-dimensional matrix $B=b_{i,j}$ which represents data. For each point $b_{i,j}$ the number of points on the trajectories of the strokes is stored, and a low-resolution image of handwriting data is provided. For example, the second class of features is as follows.

A number of under-baseline points (i.e., descenders) and above-corpus line points (i.e., ascenders) adjacent the current point; and A number of dark points within each area of the context map (the two-dimensional vicinity of the current point is converted into a 3×3 map with a width and a height set as the height of the corpus).

The electronic device may apply recurrent neutral networks (RNN) to the extracted features at operation 1540. According to an embodiment, the RNN may be a deep RNN. The electronic device may identify each letter of the handwriting entry using the RNN. According to an embodiment, the electronic device may use the RNN through a network (i.e., a server) to identify each letter of the handwriting entry.

The electronic device may decode the identified letters of the handwriting entry at operation 1550. The electronic device may identify the text of the handwriting entry through decoding. The decoding may include identifying a sequence of the most probable letters (i.e., a word or sentence) using a language model (LM). The decoding may include identifying a sequence of the most probable letters additionally using a database for text entered by the user's handwriting in the past. According to an embodiment, the electronic device may use decoding through a network (i.e., a server) to identify the text of the handwriting entry.

According to an embodiment, the handwriting decoding may be depicted as the traditional argmax question to figure out the most probable word sequence W using an observation sequence O given as shown in Equation 1.

$$\hat{W} = \arg\max_{W} p(W | O)$$
$$= \arg\max_{W} p(O | W) \cdot p(W)$$
$$= \arg\max_{W} p(W) \cdot \sum_{C} p(C | W) \cdot p(C)$$

Equation 1

In Equation (1), variable p(W) represents such a LM as ARPA Word N-gram. Variable $$\sum_{C} p(C | W)$$

represents the LM of Dictionary Word→Characters. Variable p(C) represents a trace model that means letter output probabilities from a BLSTM neural network (NN). Variable $$\arg\max_{W}$$

represents a search algorithm, such as Viterbi algorithm or beam search.

The electronic device may then recognize at least one letter using the result of decoding at operation 1560.

Figure 16:
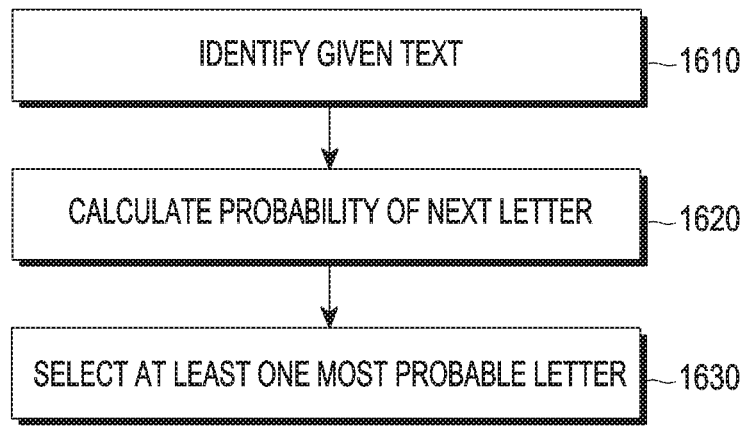
FIG. 16 is a flowchart illustrating a method of predicting at least one subsequent letter according to an embodiment of the disclosure.

FIG. 16 is a flowchart illustrating a method of predicting at least one subsequent letter according to an embodiment of the disclosure.

Referring to FIG. 16, an electronic device may identify given text at operation 1610. The given text may include at least one letter entered by handwriting.

The electronic device may calculate the probability of a next letter of the given text at operation 1620. The electronic device may calculate the probability of each of at least one letter string or at least one letter next to the given text based on the statistics for sentences used, the statistics for words used, sentences, and words including the given text. The electronic device may select the most probable letter or letter string based on the probability of each of the at least one letter string or at least one letter next to the given text at operation 1630.

According to an embodiment, an N-gram LM may be used to select at least one subsequent letter depending on probabilities. The statistical LM may be configured of two parts: words (a set of words with predicted frequencies of appearance); and the N-gram model (a combination of N words with predicted frequencies of appearance). According to an embodiment, bigram models (combinations of two words) may be used. Based on such an LM, the probability of at least one letter (e.g., a word) as follows and the most probable candidates may be produced from Equation 2.

$$P(curWord | prevWord, keySeq) =$$

Equation 2

$$\frac{C(prevWord, curWord)}{\sum\limits_{w \in words(keyseq)} C(prevWord, w)}$$

According to an embodiment, a NN model may be used to select at least one subsequent letter depending on probabilities. An example letter prediction method using the NN model may be implemented as disclosed in such a paper as "PTE, Predictive Text Embedding through Large-scale Heterogeneous Text Networks" (Jian Tang, Meng Qu, Qiaozhu Mei).

A method of synthesizing text is described below according to embodiments. Long short-term memory modes (LSTM) may apply to sequences of points which are part of handwritten text to be auto-completed. According to an embodiment, the LSTM may have 400 cells.

One-hot vector encoding may be performed on entry of a sequence of letters by handwriting. A mixture of 10 Gaussian functions is applicable to sequences of points to which the LSTM has applied, sequence of points, and entry of sequence of letters that have undergone one-hot vector encoding. Weight coefficients for the Gaussian functions for the mixture may be calculated using user-specific data. According to an embodiment, the weight coefficients may be divided into coefficients applied fixedly on the server side and coefficients applied user-specifically on the user device side.

The LSTM may repetitively apply to the results of application of the mixture of the 10 Gaussian functions. It is possible to obtain a sequence of strokes forming the handwritten text by applying 20 bivariate Gaussian mixture components after the repetitive application of the LSTM. A stroke may be configured of a sequence of points. According to an embodiment, the application of bivariate Gaussian mixture components may be implemented at an output mixture density layer which is adaptively configured at the user device.

The above-described text synthesis method may be supplemented by the disclosure of the paper "Generating Sequences With Recurrent Neural Networks" (Alex Graves).

A common part and a private part in user-specific adaptive modeling are described below. User-specific handwriting information may mean a user's handwriting style and the user's particular vocabulary (a list of words used by the user which are not included in default vocabulary). Common handwriting information may mean information about different kinds of handwriting styles for a particular language. The user-specific handwriting information and the common handwriting information may be stored in a knowledge base (a binary representation of information).

The knowledge base may include a user-specific trace model and a common trace model to perform handwriting synthesis. The knowledge base may further include a user-specific trace model and a common trace model to perform handwriting recognition. The knowledge base may include a user-specific LM and a common LM to predict text. The user-specific LM may also be available for performing handwriting recognition.

Figure 18:
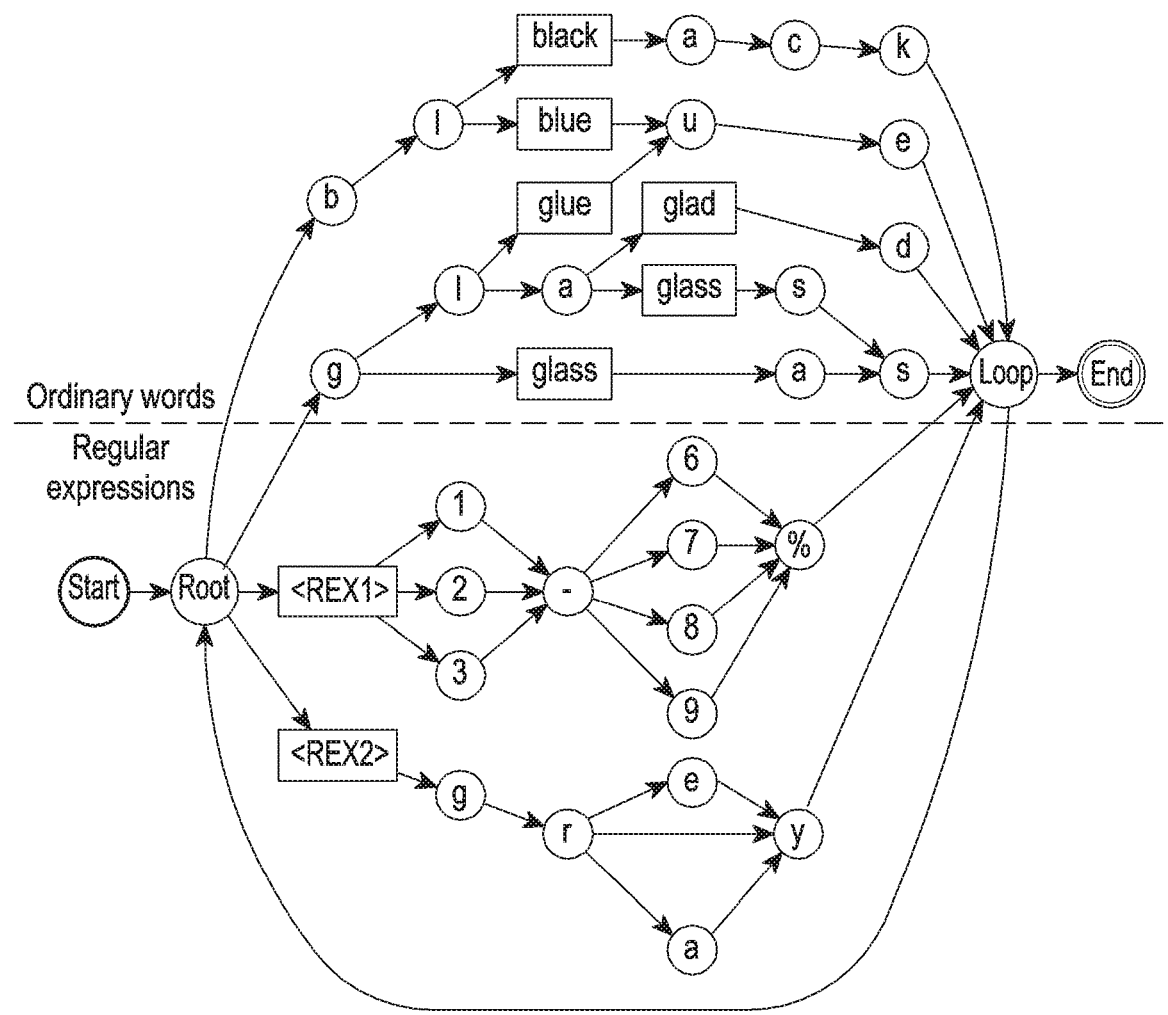
FIG. 18 is a view illustrating a decoding network for handwriting recognition according to an embodiment of the disclosure.

FIG. 18 is a view illustrating a decoding network for handwriting recognition according to an embodiment of the disclosure.

Referring to FIG. 18, an LM may be converted into a lexical tree, and recognition for the original handwriting may be carried out through optimization according to an embodiment of the disclosure.

Figure 17:
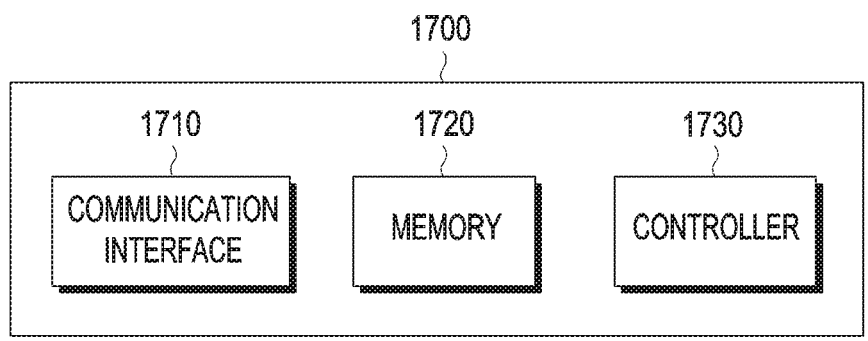
FIG. 17 is a block diagram illustrating an electronic device according to an embodiment of the disclosure.

FIG. 17 is a block diagram illustrating an electronic device according to an embodiment of the disclosure.

Referring to FIG. 17, an electronic device 1700 may include a communication interface 1710, a memory 1720, and a controller 1730. The electronic device 1700 may be any one of mobile phones, smartphones, tablet PCs, PCs, laptop computers, VR devices, or AR devices, but embodiments are not limited thereto. According to an embodiment, when the electronic device 1700 is a VR device or an AR device, the electronic device 1700 may detect entry of at least one letter based on the user's handwriting from the user's gesture in the air. According to an embodiment, the electronic device 1700 may be a home appliance, e.g., a refrigerator with a touchscreen display panel.

According to an embodiment, the electronic device 1700 may be embedded in a vehicle. In this case, the electronic device 1700 may detect the user's entry based on handwriting on any surface inside the vehicle and display at least one letter identified from the user's entry based on the user's style. The position where the user's entry is detected in the vehicle may be the same as the position in which the at least one letter is displayed, but embodiments are not limited thereto.

The electronic device 1700 may communicate with other devices via the communication interface 1710. For example, the electronic device 1700 may communicate with a server to obtain information about the style of entered letters using the communication interface 1710. For example, the electronic device 1700 may use the communication interface 1710 to communicate with a touchscreen display, tablet, or motion detector configured individually from the electronic device 1700. According to an embodiment, the electronic device 1700 may include a touchscreen display, a tablet, or a motion detector.

The memory 1720 may store commands or instructions for the operation of the electronic device 1700 and the controller 1730, transitory data, non-transitory data, and/or perpetual data. For example, the memory 1720 may store a database for the style of each of at least one user and a database for words and/or sentences entered by each of the at least one user.

The controller 1730 may be configured of at least one processor. The controller 1730 may be connected with the communication interface 1710 and the memory 1720. The controller 1730 may substantially control the operation of the electronic device 1700 by controlling the operation of the elements of the electronic device 1700 including the communication interface 1710 and the memory 1720 and other devices wiredly or wirelessly connected with the electronic device 1700. Thus, the above-described operations of the electronic device may be interpreted as performed substantially by the controller 1730.

As is apparent from the foregoing description, embodiments of the disclosure present at least the following effects.

There may be provided a display of user-adaptive handwriting entry.

Letter-entering speed may be enhanced through a user's handwriting. For example, letter-entering speed may be enhanced by completing a word using, and in the form of, a user's own handwriting. Letter-entering speed may also be enhanced by completing a sentence using, and in the form of, a user's own handwriting. Letter-entering speed may also be enhanced by showing multiple words that can be used for possible completion using, and in the form of, a user's own handwriting. Letter-entering speed may also be enhanced by re-writing a word or sentence using, and in the form of, a user's own handwriting.

The effects of the disclosure are not limited thereto, and the disclosure encompasses other various effects.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method for displaying handwriting-based input, the method comprising:
   detecting input of at least one first letter based on handwriting;
   identifying a style of the at least one first letter;
   user-adaptively deducing an intended word or sentence from the at least one first letter;
   identifying whether the at least one first letter includes an error based on the intended word or sentence deduced; and
   when the at least one first letter includes the error, displaying at least one second letter to correct the error based on the identified style of the at least one first letter.

2. The method of claim 1, wherein the detecting of the input of the at least one first letter comprises one of:
   detecting input of the at least one first letter on a touchscreen display; or
   detecting input of the at least one first letter represented according to a user's motion based on motion recognition of the user's motion.

3. The method of claim 1,
   wherein the identifying of the style of the at least one first letter comprises:
      transmitting information about the detected input of the at least one first letter to a server; and
      receiving information about the style of the at least one first letter from the server, and
   wherein the style of the at least one first letter is identified by the server based on the information about the input of the at least one first letter using deep learning.

4. The method of claim 1, wherein the identifying of the style of the at least one first letter comprises identifying a style for representing at least one letter not included in the at least one first letter.

5. The method of claim 1, further comprising:
   detecting input of at least one third letter based on handwriting;
   identifying a style of the at least one third letter; and
   displaying at least one fourth letter associated with the at least one third letter based on the identified style of the at least one third letter,
   wherein the at least one second letter and the at least one fourth letter are simultaneously displayed.

6. The method of claim 1,
   wherein the at least one second letter is displayed in a different form from the at least one first letter, and
   wherein in response to a user's input to confirm input of the at least one second letter, a form of the at least one second letter is changed to be the same as a form of the at least one first letter.

7. The method of claim 1,
   wherein the at least one second letter comprises at least one third letter and at least one fourth letter to, together with the at least one first letter, complete words or sentences different from each other, and
   wherein the method further comprises displaying a word or a sentence completed based on at least one selected letter among the at least one third letter and the at least one fourth letter in response to detecting input to select any one of the at least one third letter and the at least one fourth letter.

8. The method of claim 1, wherein the identifying of the style of the at least one first letter comprises identifying information about a style of at least one of a first user and a second user,
   wherein the displaying of the at least one second letter comprises:
      displaying the at least one second letter in a style of a first user if it is identified that the style of the at least one first letter is associated with the first user; and
      displaying the at least one second letter in a style of a second user if it is identified that the style of the at least one first letter is associated with the second user.

9. An electronic device configured to display handwriting-based input, the electronic device comprising:
   a memory;
   a communication interface; and
   at least one processor connected with the memory and the communication interface, wherein the at least one processor is configured to:
      detect input of at least one first letter based on handwriting,
      identify a style of the at least one first letter,
      user-adaptively deducing an intended word or sentence from the at least one first letter,
      identifying whether the at least one first letter includes an error based on the intended word or sentence deduced, and
      when the at least one first letter includes the error, display at least one second letter associated with the at least one first letter to correct the error based on the identified style of the at least one first letter.

10. The electronic device of claim 9, wherein the at least one processor is further configured to:
    detect input of the at least one first letter by detecting input of the at least one first letter on a touchscreen display, or
    detect input of the at least one first letter represented according to a user's motion based on motion recognition of the user's motion.

11. The electronic device of claim 9,
    wherein to identify the style of the at least one first letter, the at least one processor is further configured to:
       transmit information about the detected input of the at least one first letter to a server, and
       receive information about the style of the at least one first letter from the server, and
    wherein the style of the at least one first letter is identified by the server based on the information about the input of the at least one first letter using deep learning.

12. The electronic device of claim 9, wherein the identifying of the style of the at least one first letter comprises identifying a style for representing at least one letter not included in the at least one first letter.

13. The electronic device of claim 9,
    wherein the at least one processor is further configured to:
       detect input of at least one third letter based on handwriting,
       identify a style of the at least one third letter, and display at least one fourth letter associated with the at least one third letter based on the identified style of the at least one third letter, and wherein the at least one second letter and the at least one fourth letter are simultaneously displayed.

14. The electronic device of claim 9, wherein the at least one second letter is displayed in a different form from the at least one first letter, and wherein in response to a user's input to confirm input of the at least one second letter, a form of the at least one second letter is changed to be the same as a form of the at least one first letter.

15. The electronic device of claim 9, wherein the at least one second letter comprises at least one third letter and at least one fourth letter to, together with the at least one first letter, complete words or sentences different from each other, and wherein the at least one processor is further configured to display a word or a sentence completed based on at least one selected letter among the at least one third letter and the at least one fourth letter in response to detecting input to select any one of the at least one third letter and the at least one fourth letter.

16. The electronic device of claim 9, wherein the identifying of the style of the at least one first letter comprises receiving information about a style of at least one of a first user and a second user, and wherein the displaying of the at least one second letter comprises:

displaying the at least one second letter in a style of a first user if it is identified that the style of the at least one first letter is associated with the first user, and displaying the at least one second letter in a style of a second user if it is identified that the style of the at least one first letter is associated with the second user.

* * * * *